(12) United States Patent
Schleiden

(10) Patent No.: US 8,555,827 B2
(45) Date of Patent: Oct. 15, 2013

(54) SEPARATOR FOR A CRANKCASE VENTILATION OF AN INTERNAL COMBUSTION ENGINE

(75) Inventor: Thomas Schleiden, Oberstenfeld (DE)

(73) Assignee: Mann+Hummel GmbH, Ludwigsburg (DE)

( * ) Notice: Subject to any disclaimer, the term of this patent is extended or adjusted under 35 U.S.C. 154(b) by 335 days.

(21) Appl. No.: 12/937,065

(22) PCT Filed: Mar. 17, 2009

(86) PCT No.: PCT/EP2009/053127
§ 371 (c)(1),
(2), (4) Date: Oct. 8, 2010

(87) PCT Pub. No.: WO2009/124828
PCT Pub. Date: Oct. 15, 2009

(65) Prior Publication Data
US 2011/0030629 A1 Feb. 10, 2011

(30) Foreign Application Priority Data
Apr. 8, 2008 (DE) .......................... 10 2008 017 919

(51) Int. Cl.
*F01M 13/00* (2006.01)
(52) U.S. Cl.
USPC ........................... 123/41.86; 123/573; 55/337
(58) Field of Classification Search
USPC ................... 123/41.86, 573; 55/337
See application file for complete search history.

(56) References Cited

U.S. PATENT DOCUMENTS

| | | | | |
|---|---|---|---|---|
| 5,450,835 A | * | 9/1995 | Wagner | 123/573 |
| 5,487,370 A | * | 1/1996 | Miyazaki | 123/538 |
| 5,487,371 A | * | 1/1996 | Beckman et al. | 123/572 |
| 6,591,820 B2 | * | 7/2003 | Kitano et al. | 123/572 |
| 6,626,163 B1 | * | 9/2003 | Busen et al. | 123/572 |
| 6,832,603 B2 | * | 12/2004 | Knollmayr | 123/572 |
| 6,973,925 B2 | * | 12/2005 | Sauter et al. | 123/572 |
| 7,059,311 B2 | * | 6/2006 | Prasad | 123/573 |
| 7,401,599 B2 | * | 7/2008 | Saito | 123/518 |
| 7,422,612 B2 | * | 9/2008 | Pietschner | 55/309 |
| 2001/0005986 A1 | * | 7/2001 | Matsubara et al. | 55/459.1 |
| 2007/0294986 A1 | * | 12/2007 | Beetz et al. | 55/385.3 |

FOREIGN PATENT DOCUMENTS

DE 19951312 5/2001

OTHER PUBLICATIONS

PCT Search Report of PCT/EP2009/053127.

* cited by examiner

*Primary Examiner* — Noah Kamen
*Assistant Examiner* — Long T Tran
(74) *Attorney, Agent, or Firm* — James Hasselbeck

(57) ABSTRACT

The invention relates to a separator (1) for a crankcase ventilation of an internal combustion engine. The separator (1) comprises at least one swirl chamber (2), which extends along a longitudinal axis (3), wherein said swirl chamber (2) has a tangential inlet for a ventilation flow (6) at an intake-side end (4) relative to the longitudinal axis (3) thereof. The swirl chamber (2) additionally has a shared outlet (8) for the ventilation flow (6) and oil (9) entrained with the ventilation flow (6) on the outlet-side end thereof opposite the intake-side end (4) relative to the longitudinal axis (3), wherein a post-separator (10) is disposed downstream of the swirl chamber (2).

13 Claims, 2 Drawing Sheets

SEPARATOR FOR A CRANKCASE VENTILATION OF AN INTERNAL COMBUSTION ENGINE

CROSS REFERENCE TO RELATED APPLICATIONS

This application is a US national stage entry of international application No. PCT/EP2009/053127 having an international filing date of Mar. 17, 2009 and designating the United States, the International Application claiming a priority date of Apr. 8, 2008 based on prior filed German patent application No. 10 2008 017919.1. The entire contents of the aforesaid international application and the aforesaid German patent application being incorporated herein by reference to the fullest extent permitted by the law.

TECHNICAL FIELD

The invention concerns a separator for crankcase ventilation of an internal combustion engine with the features according to the preamble of claim 1.

PRIOR ART

In crankcase ventilation of internal combustion engines swirl separators with a swirl chamber are used. The swirl chamber extends along a longitudinal axis and has relative to this longitudinal axis an inlet end with a tangential inlet for the venting stream. A swirling action is imposed on the venting stream in the swirl chamber as a result of the tangential inflow and the swirl, in connection with the acting centrifugal forces, leads to separation of the oil entrained in the venting stream. The oil deposits on the walls of the swirl chamber and is drained through a drain opening.

Typically, for this purpose the configuration of a so-called counter-flow cyclone is employed in which the drain opening for the oil and the outlet for the purified gas stream are positioned on opposite ends of the swirl chamber. The outlet is positioned on the same side as the inlet while the drain opening is arranged at the opposite side. In this connection, the flow is subjected to a deflection and is discharged through a so-called immersion pipe at the top side of the swirl chamber at the inlet side. Alternatively, so-called parallel flow cyclones can be used also in which the drain opening for the oil and the separate outlet for the purified gas are on the same side and thus opposite to the inlet. In a direct comparison the counter flow cyclones has a better ratio between pressure loss and separating diameter or degree of separation wherein the separating diameter is used as a measure for the lower limit of the oil droplets to be separated.

Moreover, it is known that in swirl separators the separating diameter generally depends on, aside from pressure loss, also on the size of the separator. For the same pressure loss, the separating diameter drops with decreasing size of the swirl separator. Accordingly, the degree of separation for smaller particles is increased also for decreasing apparatus size. For this reason, there is the need to use, instead of one or several swirl separators of larger size, a larger number of smaller parallel-connected swirl separators.

However, there are manufacture-related geometric limits for making the counter flow cyclones smaller, for example, because of the existing immersion pipe, so that miniaturization cannot be advanced to an unlimited extent. The same holds true also for parallel flow cyclones in which the drain opening for the oil and the outlet for the purified gas stream require an appropriate size. Accordingly, there is still the need to improve the degree of separation while reducing the device volume.

The invention has therefore the object to further develop a separator of the aforementioned kind such that an increased efficiency is achieved with a smaller size.

This object is solved by a separator having the features of claim 1.

SUMMARY OF THE INVENTION

A separator for a crankcase ventilation of an internal combustion engine is proposed in which the swirl chamber relative to its longitudinal axis has a common outlet at an outlet-side end opposite the inlet-side end for the venting stream and for the oil that is entrained in the venting stream.

The swirl chamber does not act as a separator because the oil, in deviation from the known configuration as parallel flow cyclone, exits together with the venting stream, i.e., has not yet been separated from the venting stream. Instead, the swirl chamber acts as a so-called coalescing device in which the swirl causes coagulation of the oil mist and finest oil droplets to larger oil droplets or to an oil film. Elimination of the separation of oil and venting stream at the outlet enables almost any miniaturization of the swirl chamber that can then be used in appropriately large numbers. The coagulation effect of the individual coalescing devices can be significantly increased by size minimization. The exiting oil film or the exiting coagulated large oil droplets can be separated by a post-separator of a simple configuration in a simple way from the venting stream. Such a post-separator in the simplest case can be realized by flow calming or a simple deflection. The additional expenditure of the post-separator is more than compensated by the improved efficiency of the coalescing device.

In comparative tests it has been found that geometries of the coalescing device down to a diameter of approximately 10 mm and a height of approximately 20 mm are possible. This provides that for the same pressure loss and total volume stream the number of coalescing devices in comparison to counter flow cyclones can be essentially quintupled. The thus resulting separating diameter theoretically is approximately half of the separating diameter of a comparable separator with counter flow cyclones. It is even possible to provide excellent separating performance for particles or droplets in the range of <1 μm.

In a preferred embodiment the swirl chamber tapers at least sectionwise beginning at the inlet toward the outlet; this tapering action is in particular of a conical shape.

Alternatively, there is also the possibility to design the swirl chamber of a continuous cylindrical shape or to have one or several jumps in diameter toward the outlet.

As the venting stream passes through the swirl chamber, the diameter of its swirl movement successively decreases so that the swirl action is increased and the separation performance is improved.

It can be expedient to embody the outlet like the inlet to be tangential wherein the swirl is converted into a corresponding outlet velocity. Preferably, the outlet is arranged axis-parallel and in particular coaxial to the longitudinal axis of the swirl chamber so that the swirl formation and thus the coagulating effect is promoted.

As a post-separator, different suitable configurations are considered wherein simple embodiments are satisfactory because of the preceding coagulation of the oil mist or oil droplets. Preferably, the post-separator has at least one impact surface for the oil that is entrained in the venting stream. As a result of its mass inertia, the oil droplets hit the impact surface and flow down thereat as an oil film while the purified gas stream will flow past the impact surface. With simplest means, an effective separation of the coagulated droplets is possible in this way.

In an advantageous further embodiment, the post-separator is embodied as a labyrinth for the venting stream with several impact surfaces that are in particular angularly slanted relative to one another. As a result of the multiple labyrinth-like deflection, the effect described above will occur several times so that the gas stream can easily follow the deflections while the coagulating oil droplets as a result of their mass inertia cannot easily follow these deflections and therefore impinge on the impact surfaces. With minimal size, an effective separation is possible because of the size of the coagulated oil droplets.

Preferably, at least one impact surface is arranged at least approximately perpendicularly to the longitudinal axis of the swirl chamber or its outlet. In this way, the effect is utilized that the venting stream with the entrained coagulated oil droplets has a high velocity and thus a high kinetic energy so that a significant proportion of the coagulated oil droplets as a result of their mass inertia even without multiple flow deflections impact on the corresponding impact surface and are thus separated from the venting stream.

In the end, in the simplest case of a separation a flow calming action may be expedient wherein the particles will sediment in accordance with gravity.

Under certain conditions it may be expedient to provide only one swirl chamber embodied as a coalescing device with a downstream post-separator. In a preferred embodied, several swirl chambers are connected in parallel to one another. This enables the desired size reduction with simultaneous increase of the number of parallel-connected swirl chambers so that the degree of coagulation is improved.

Advantageously, in particular a register embodied as a slide register is provided for motor load-dependent activation and deactivation of individual swirl chambers. This takes into account that with increasing motor load also an increasing volume of venting stream will be produced. With a suitable connection with, for example, a pressure box or another control device it can be achieved that the swirl chambers that are activated at a respective motor operating point are individually loaded with such a partial flow for which they are designed to produce an optimal coagulation effect. In this way, the separator can be used at the same time also for regulation of the crankcase pressure.

As a whole, with the arrangement of very many small swirl chambers a high flexibility for the geometric configuration is enabled that simplifies integration into the already existing usually very limited space. In this connection, the entire concept is independent of the installed position relative to the direction of gravity because the coalescing devices have no directionally bound drain openings. For certain, for example, very flat mounting spaces, the integration of a fine oil separator is enabled for the first time by the configuration according to the invention as a result of the possible miniaturization and positional independence.

BRIEF DESCRIPTION OF THE DRAWINGS

One embodiment of the invention will be explained in the following with the aid of the drawing in more detail. It is shown in.

EMBODIMENT(S) OF THE INVENTION

Figure 1:
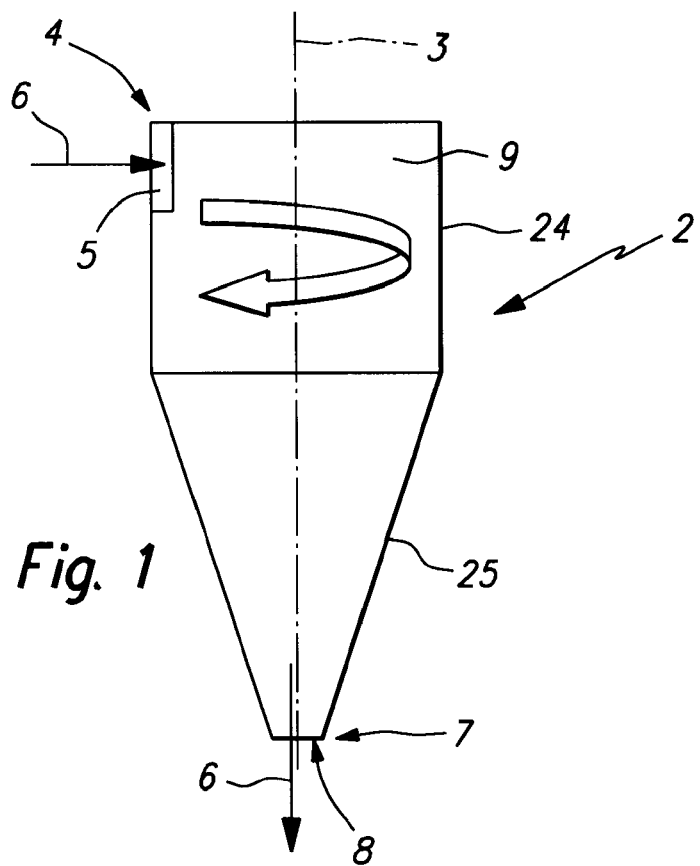
FIG. 1 in a schematic longitudinal section view a swirl chamber of the separator according to FIG. 2 with a common outlet for the venting stream and the oil entrained by the venting stream.
Figure 2:
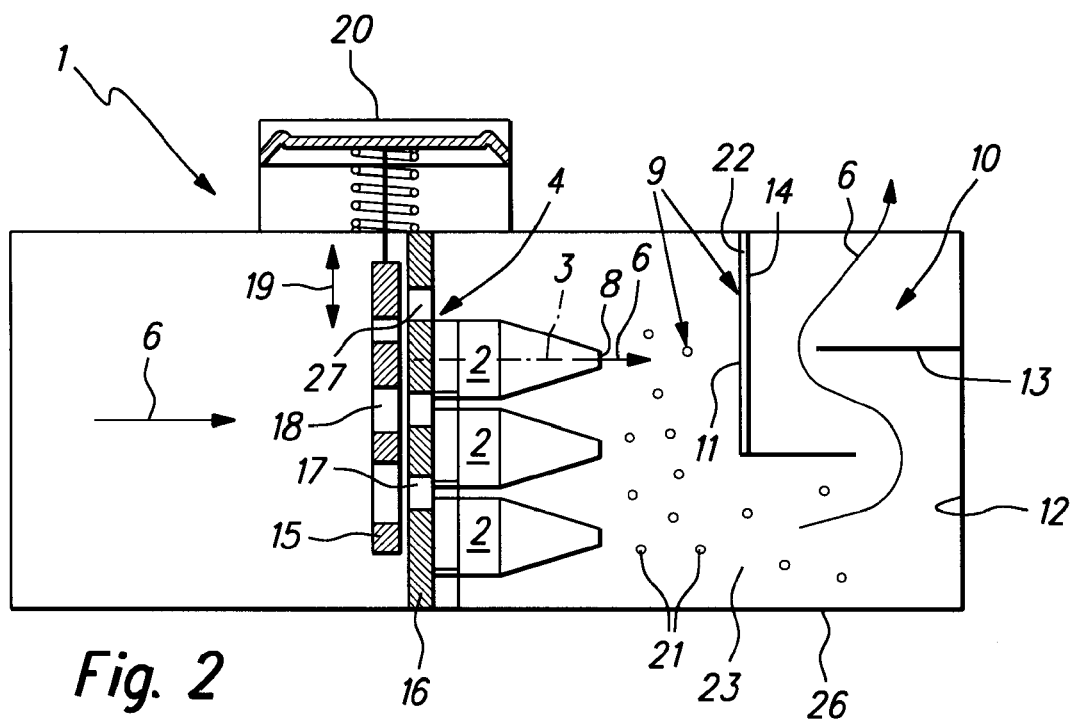
FIG. 2 in a schematic block diagram a separator according to the invention with swirl chambers according to FIG. 1 and a downstream post-separator provided with impact surfaces.

FIG. 1 shows in a schematic longitudinal illustration a swirl chamber 2 of the separator 1 illustrated in FIG. 2 that is embodied as a so-called coalescing device. The swirl chamber 2 comprises a housing that extends with rotational symmetry along a longitudinal axis 3 and that, relative to the longitudinal axis 3, has an inlet-side end 4 and an oppositely positioned outlet-side end 7. At the inlet-side end 4 an inlet 5 opens tangentially into the swirl chamber 2. In the illustrated embodiment the inlet 5 has a rectangular cross-section. However, other cross-sectional shapes can also be expedient.

In the area of the tangential inlet 5 the housing of the swirl chamber 2 is embodied as a cylindrical section 24 that is adjoined in the direction toward the outlet-side end 7 by a conically tapering section 25. The conical section 25 is open at the outlet-side end 7 and forms thereat an outlet 8 with circular cross-section whose diameter is identical to the diameter of the conical section 25 at the outlet-side end 7. Instead of a conical section 25, another tapering shape can be used also or a cylindrical shape can be expedient. The central axis of the outlet 8 is preferably positioned axis-parallel, in the illustrated embodiment coaxial, to the longitudinal axis 3 of the swirl chamber 2.

In operation of an internal combustion engine, not illustrated, so-called blow-by gases are produced in its crankcase that are guided as a venting stream 6 through the inlet 5 tangentially into the cylindrical section 24 of the swirl chamber 2. When doping so, oil 9, not illustrated in detail, is entrained in the form of vapor, mist or fine droplets together with other accompanying substances into the swirl chamber 2. As a result of the tangential introduction, a swirl is produced in the intake chamber 2 in accordance with the arrow illustrated therein which swirl causes coagulation of the oil mist or vapors and fine droplets to significantly larger oil droplets and also to an oil film on the inner walls of the swirl chamber 2.

With the exception of the inlet 5 and the outlet 8, the swirl chamber 2 is closed so that the venting stream 6 together with the coagulated oil 9 will exit from the outlet 8.

FIG. 2 shows in schematic block illustration an inventively configured separator 1 with a plurality of swirl chambers 2 in accordance with FIG. 1 wherein for reasons of simplification of the illustration schematically only three swirl chambers 2 are illustrated. In reality, a significantly higher number of swirl chambers 2 may be advantageous also. For certain applications, the arrangement of only one swirl chamber 2 may be expedient also. The separator 1 is provided for the crankcase ventilation of an internal combustion engine, in particular of a motor vehicle, wherein the venting stream 6 that is produced is introduced into a housing 26 of the separator 1. In the housing 26 a baseplate 16 is arranged that supports the swirl chamber 2 and that has for each one of the swirl chambers 2 an inlet opening 17. Through the inlet openings 17 the venting stream 6 is supplied to the inlet-side end 4 of the swirl chamber 2, respectively, and exits at the outlets 8. In accordance with the coagulation effect that has been explained above in connection with FIG. 1, the oil 9 that is entrained in the venting stream 6 forms a plurality of larger coagulated oil drops 21 that together with the venting stream 6 flow out of the outlets 8 of the swirl chambers 2.

The interior of the housing 26 is divided by the baseplate 16 such that downstream of the baseplate 16 together with the swirl chambers 2 a collecting chamber 23 is formed. In this collecting chamber 23 a post-separator is arranged that advantageously has at least one impact surface 11. In the illustrated embodiment several walls with several impact surfaces 11, 12, 13, 14 are arranged to form a labyrinth through which the venting stream 6 passes on a meandering path. In the illustrated embodiment the impact surfaces 11, 12, 13, 14 are positioned perpendicularly relative to one another. However, other angle orientations may be expedient. In this connection, at least one impact surface 11 is perpendicular to the longitudinal axis 3 of the swirl chambers 2 or the correlated outlets 8. In the illustrated embodiment, two impact surfaces 11, 12 are perpendicular thereto and in direct line of sight with the outlets 8. Instead of the perpendicular 90 degree position another oblique angle of preferably ≥45 degrees and in particular ≥60 degrees may also be expedient. In the simplest case, the volume of the collecting chamber 23 represents the post-separator wherein a separation of the oil from the venting gas can be realized without further deflections as a result of sedimentation.

The venting stream 6 is guided in accordance with the illustrated meandering arrow through the labyrinth-like post-separator 10 while the coagulated oil droplets 21 as a result of their mass inertia impact on the impact surfaces 11, 12, 13, 14 and form thereon an oil film 22 as illustrated in an exemplary fashion on the impact surface 11. From here, the oil 9 can flow down and can be returned by a drainage, not illustrated, into the oil sump of the internal combustion engine. The venting stream 6 that is purified by the post-separator 10 is admixed to the fresh combustion air of the internal combustion engine.

For a motor load-dependent control of the separator 1, upstream of the baseplate 16 a register 15 embodied as a slide register is arranged that has differently sized control openings 18. The register 15 is slidable in a direction of double arrow 19 parallel to the surface of the baseplate 16 so that depending on the sliding state one or several control openings 18 will be aligned with the inlet openings 17 of the swirl chambers 2. With increasing motor load and thus increasing pressure in the crankcase an increasing number of swirl chambers 2 can be activated and with decreasing motor performance also deactivated again. In supplementing this, in the baseplate 16 or at any other suitable location a bypass opening 27 can be arranged also which upon full load with circumvention of the swirl chambers 2 can be released by means of the register 15 and a correlated control opening 18. The control of the register 15 can be done in various ways. In the illustrated embodiment, for this purpose a pressure box 20 is provided that, for example, is loaded with the pressure in the crankcase of the internal combustion engine. In this way, a correlation between the pressure in the crankcase and the number of swirl chambers 2 that are activated or deactivated is provided. It is ensured that the permissible range for the crankcase pressure is complied with and the individual pressure chambers 2 each are flowed through with optimal flow velocity and pressure loss.

Figure 3:
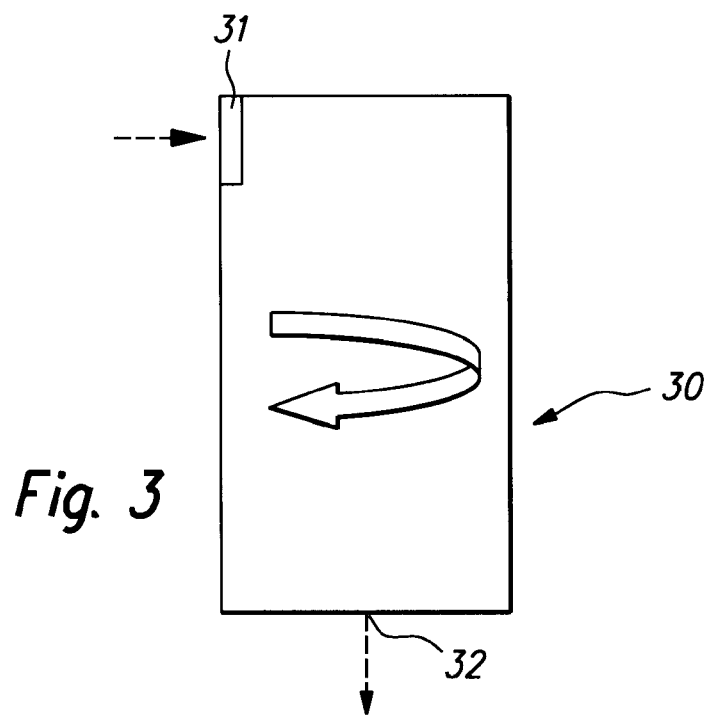
FIG. 3 a geometric variant of a separator with substantially cylindrical shape.

The separator 30 illustrated in FIG. 3 has a tangential inlet 31, as also illustrated in FIG. 1, and an outlet for the pure gas and for the oil the outlet 32. The outlet 32 is simply a bore that is provided at the bottom of the separator 30 and is connected to a conduit, not illustrated. The separator 30 is cylindrically embodied about its entire length. In this way, a constant air flow that will not accelerate is provided within the separator.

Figure 4:
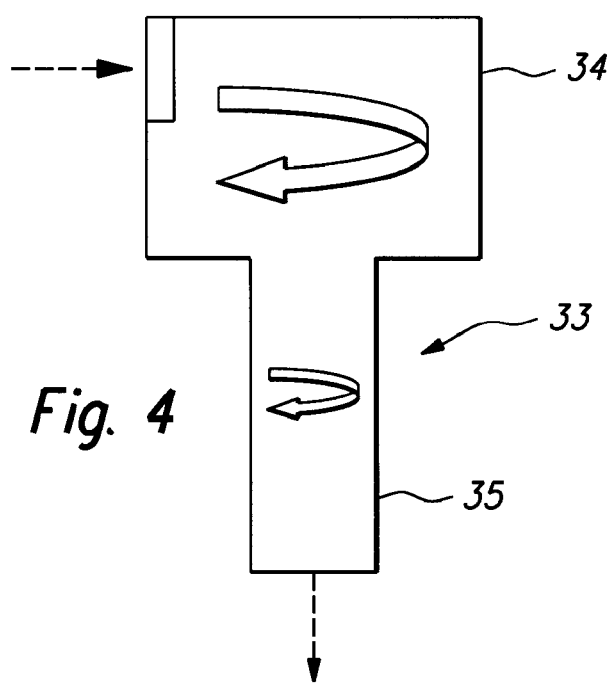
FIG. 4 a further geometric variant of a separator with a diameter jump.

A further variant is illustrated in FIG. 4. This separator 33 has a jump in diameter. The upper part 34 is designed in accordance with the separator illustrated in FIG. 3. Below this upper part, there is a separator part 35 with a reduced diameter. Of course, there is also the possibility to arrange further jumps in diameter or to provide smaller jumps in diameter. The pure gas and the oil are discharged as disclosed in connection with FIG. 3.

The invention claimed is:

1. A crankcase ventilation oil separator for an internal combustion engine, comprising:
 a swirl chamber device including
  a circumferentially extending wall section defining a swirl chamber within, said swirl chamber extending along a longitudinal axis of said swirl chamber device;
  a tangential inlet arranged at an inlet-side end of said swirl chamber device, said tangential inlet introducing a vent gas stream into said swirl chamber producing a swirling action of said vent gas stream around an interior of said cylindrical wall section, said swirling action coagulating oil droplets, separating oil entrained in said vent gas stream;
  a common outlet arranged at an opposing outlet-side end of said swirl chamber device relative to said longitudinal axis, said common outlet in fluid communication with said swirl chamber; and
 wherein a said vent gas stream and said coagulated oil droplet exit said swirl chamber device through said common outlet;
 wherein the swirl chamber has arranged downstream thereof a post-separator collecting said coagulated oil droplets;
 wherein said swirl chamber tapers at least section wise along said longitudinal axis from said tangential inlet to said common outlet;
 wherein said taper is either conically or by a jump in diameter of said circumferentially extending wall section;
 wherein said common outlet is arranged coaxial to said longitudinal axis of the swirl chamber device;
 wherein said post-separator define a collecting chamber in fluid communication with said common outlet, said collecting chamber collecting said coagulated oil droplets from said vent gas stream flowing from said common outlet by sedimentation separation of said coagulated oil droplets from said vent gas stream;
 wherein said post-separator further includes a plurality of impact surfaces arranged as a labyrinth providing a tortuous flow path form said vent gas stream exiting said common outlet;
 wherein at least one of said impact surfaces is arranged at least approximately perpendicularly to said longitudinal axis of said swirl chamber;
 wherein a plurality of swirl chambers are connected to process said vent gas stream in parallel to one another;
 a slide register having at least one control opening extending therethrough said control opening in fluid communication with said vent gas stream upstream of said swirl chamber devices;
 a base plate having at least one control opening extending therethrough;
 wherein said register is slidable relative to said base plate, said sliding opening or blocking correlated control openings in said register and said base plate controlling flow of said vent gas stream through said control openings;

wherein said control openings in said base plate are in fluid communication with said tangential inlet of said swirl chamber; and wherein said register is operable for motor load-dependent activation and deactivation of individual swirl chambers.

2. The separator according to claim 1, further comprising:

a pressure box including an actuating element, said actuating element responsive to crankcase pressure, said actuating element mechanically connected to said register;

wherein slide positioning of said register is realized by means of said pressure box actuator, said pressure box actuator through said register opening or closing said correlated control openings controlling vent gas flow to said swirl chambers as a function of the pressure in the crankcase.

3. The separator according to claim 2, further wherein said register has a bypass opening extending therethrough;

wherein said base plate has a bypass opening extending therethrough, said base plate bypass opening correlated with said register bypass opening, wherein said register is operable to fluidically open said register bypass opening to said base plate bypass opening permitting at least a portion of said vent gas stream to flow from said common outlet to said collecting chamber bypassing said swirl chamber devices;

wherein said bypass openings are fluidically opened by said actuating element of said pressure box at a maximum permissable pressure in said crankcase.

4. A crankcase ventilation oil separator for an internal combustion engine, comprising:

a swirl chamber device including a circumferentially extending wall section defining a swirl chamber within, said swirl chamber extending along a longitudinal axis of said swirl chamber device;

a tangential inlet opening tangentially into said swirl chamber and arranged at an inlet-side end of said swirl chamber device, said tangential inlet introducing a vent gas stream tangentially into said swirl chamber producing a swirling action of said vent gas stream around an interior of said cylindrical wall section, said swirling action coagulating oil droplets, separating oil entrained in said vent gas stream;

a common outlet arranged at an opposing outlet-side end of said swirl chamber device relative to said longitudinal axis, said common outlet in fluid communication with said swirl chamber; and wherein said vent gas stream and said coagulated oil droplet exit said swirl chamber device through said common outlet; and wherein the swirl chamber has arranged downstream thereof a post-separator collecting said coagulated oil droplets.

5. The separator according to claim 4, wherein said swirl chamber tapers at least section wise along said longitudinal axis from said tangential inlet to said common outlet; and wherein said taper is either conically or by a jump in diameter of said circumferentially extending wall section.

6. The separator according to claim 5, wherein said common outlet is arranged coaxial to said longitudinal axis of the swirl chamber device.

7. The separator according to claim 6, wherein said post-separator define a collecting chamber in fluid communication with said common outlet, said collecting chamber collecting said coagulated oil droplets from said vent gas stream flowing from said common outlet by sedimentation separation of said coagulated oil droplets from said vent gas stream.

8. The separator according to claim 7, wherein said post-separator further includes a plurality of impact surfaces arranged as a labyrinth providing a tortuous flow path form said vent gas stream exiting said common outlet.

9. The separator according to claim 8, wherein at least one of said impact surfaces is arranged at least approximately perpendicularly to said longitudinal axis of said swirl chamber.

10. The separator according to claim 9, wherein a plurality of swirl chambers are connected to process said vent gas stream in parallel to one another.

11. The separator according to claim 4, further comprising:

a slide register having at least one control opening extending therethrough said control opening in fluid communication with said vent gas stream upstream of said swirl chamber devices;

a base plate having at least one control opening extending therethrough;

wherein said register is slidable relative to said base plate, said sliding opening or blocking correlated control openings in said register and said base plate controlling flow of said vent gas stream through said control openings;

wherein said control openings in said base plate are in fluid communication with said tangential inlet of said swirl chamber; and wherein said register is operable for motor load-dependent activation and deactivation of individual swirl chambers.

12. The separator according to claim 11, further comprising:

a pressure box including an actuating element, said actuating element responsive to crankcase pressure, said actuating element mechanically connected to said register;

wherein slide positioning of said register is realized by means of said pressure box actuator, said pressure box actuator through said register opening or closing said correlated control openings controlling vent gas flow to said swirl chambers as a function of the pressure in the crankcase.

13. The separator according to claim 12, further wherein said register has a bypass opening extending therethrough;

wherein said base plate has a bypass opening extending therethrough, said base plate bypass opening correlated with said register bypass opening, wherein said register is operable to fluidically open said register bypass opening to said base plate bypass opening permitting at least a portion of said vent gas stream to flow from said common outlet to said collecting chamber bypassing said swirl chamber devices;

wherein said bypass openings are fluidically opened by said actuating element of said pressure box at a maximum permissable pressure in said crankcase.

\* \* \* \* \*